United States Patent [19]
Kondo et al.

[11] Patent Number: 5,519,865
[45] Date of Patent: May 21, 1996

[54] SYSTEM AND METHOD FOR RETRIEVING AND CLASSIFYING DATA STORED IN A DATABASE SYSTEM

[75] Inventors: Shozo Kondo; Keiji Kobayashi, both of Kamakura, Japan

[73] Assignee: Mitsubishi Denki Kabushiki Kaisha, Tokyo, Japan

[21] Appl. No.: 278,058

[22] Filed: Jul. 20, 1994

[30] Foreign Application Priority Data

Jul. 30, 1993 [JP] Japan .................................. 5-190577

[51] Int. Cl.⁶ .................................................. G06F 17/30
[52] U.S. Cl. .................................. 395/600; 364/DIG. 1; 364/282.1; 364/282.3; 364/283.1
[58] Field of Search ........................ 395/600, 154, 395/155, 159, 425

[56] References Cited

U.S. PATENT DOCUMENTS

| | | | |
|---|---|---|---|
| 4,803,614 | 2/1989 | Banba et al. | 395/275 |
| 5,047,918 | 9/1991 | Schwartz et al. | 395/600 |
| 5,065,347 | 11/1991 | Pajak et al. | 395/159 |
| 5,179,658 | 1/1993 | Izawa et al. | 395/164 |
| 5,201,047 | 4/1993 | Maki et al. | 395/600 |
| 5,388,196 | 2/1995 | Pajak et al. | 395/153 |
| 5,410,692 | 4/1995 | Torres | 395/600 |

Primary Examiner—Thomas G. Black
Assistant Examiner—Peter Y. Wang
Attorney, Agent, or Firm—Wolf, Greenfield & Sacks

[57] ABSTRACT

A retrieval interface system which allows a user to view a retrieval result as a percentage of a total number of files, and to further classify the retrieval result into groups based upon attributes of the files. The retrieval interface system includes a classifying section which classifies the contents of a database based on a classification method, a display management section, a classification method storage section, a control section, a history information storage section which retains history information of retrieval conditions, and a quantity display conversion section which converts display elements into a form from which the user can determine the number of elements in each group.

15 Claims, 11 Drawing Sheets

| CLASSIFIED BY OR ACCORDING TO | PARAMETER SPECIFICATION | ATTRIBUTES | | | | |
|---|---|---|---|---|---|---|
| | | FILE NAME | CREATOR | SIZE | TYPE | DATE |
| ALPHABETICAL ORDER OF FIRST ONE CHARACTER | | O | | | | |
| SAME FIRST CHARACTERS | | O | O | | | |
| FAMILY NAME | | | O | | | |
| FULL NAME | | | O | | | |
| SPECIFIED RANGE | O | | O | | | |
| APPLICATION TYPE | O O | | | | | |
| FOR EACH APPLICATION | | | | | O | |
| YEAR | | | | | | O |
| YEAR MONTH | | | | | | O |
| YEAR MONTH DAY | | | | | | O |
| TIME | | | | | | O |

| CLASSIFICATION METHOD NAME | PROGRAM NAME | PARAMETERS |
|---|---|---|
| CLASSIFICATION IN ALPHABETICAL ORDER OF FIRST ONE CHARACTER | ABCDE | ......... |
| CLASSIFICATION BY SAME FIRST CHARACTERS | FirstChars | ? |
| CLASSIFICATION BY RANGE | Range | (Size, Date), ? |
| CLASSIFICATION BY APPLICATION TYPE | TypeApp | ? |
| CLASSIFICATION FOR EACH APPLICATION | TypeApp | * |
| ......... | ......... | ......... |
| KILO RANGE | Range | Size, 1000 |
| APPLICATION CLASSIFICATION (1) | TypeApp | Group([Wordprocessor,(wp1,wp2,wp3,wp4)], [CAD tool, (cad1, cad2, cad3), [Spreadsheet, (ss1, ss2, ss3)]]) |

Fig. 8

SORTING ACCORDING TO FILE NAME (WITH NO CLASSIFICATION)

| FILE NAME | SIZE | TYPE | CREATOR | CREATION DATE |
|---|---|---|---|---|
| ESTIMATE (1) | 4 K | ss 1 | A | 1993/1/28 |
| ESTIMATE (2) | 5 K | ss 1 | B | 1993/1/29 |
| DRAWING (1) | 20 K | cad 1 | C | 1993/1/28 |
| DRAWING (2) | 50 K | cad 2 | D | 1993/1/30 |
| DESIGN (1) | 10 K | wp 3 | A | 1993/1/28 |
| DESIGN (2) | 8 K | wp 4 | B | 1993/1/29 |
| REPORT (1) | 3 K | wp 2 | A | 1993/2/1 |
| REPORT (2) | 3 K | wp 1 | A | 1993/2/1 |

SORTING ACCORDING TO SIZE (IN DESCENDING ORDER WITH NO CLASSIFICATION)

| SIZE | FILE NAME | TYPE | CREATOR | CREATION DATE |
|---|---|---|---|---|
| 50 K | DRAWING (2) | cad 2 | D | 1993/1/30 |
| 20 K | DRAWING (1) | cad 1 | C | 1993/1/28 |
| 10 K | DESIGN (1) | wp 3 | A | 1993/1/28 |
| 8 K | DESIGN (2) | wp 4 | B | 1993/1/29 |
| 5 K | ESTIMATE (2) | ss 1 | B | 1993/1/29 |
| 4 K | ESTIMATE (1) | ss 1 | A | 1993/1/28 |
| 3 K | REPORT (1) | wp 2 | A | 1993/2/1 |
| 3 K | REPORT (2) | wp 1 | A | 1993/2/1 |

CLASSIFICATION BY TYPE OF APPLICATION USED FOR CREATING DOCUMENTS

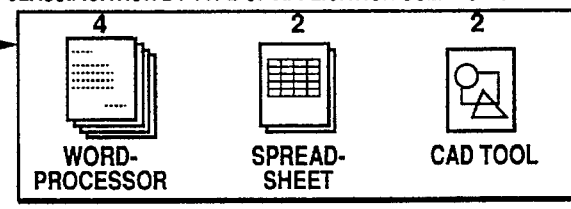

CLASSIFICATION BY CREATION DATE OF DOCUMENTS

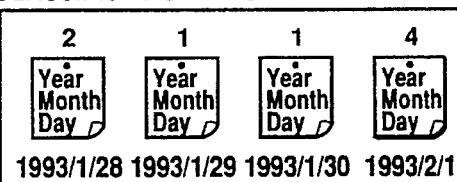

CLASSIFICATION BY FAMILY NAME OF CREATOR OF DOCUMENTS

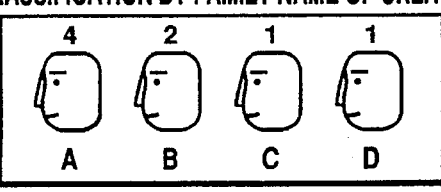

Fig. 9

| REGISTRATION NO. | RETRIEVAL INFORMATION (RETRIEVAL FILTER) |
|---|---|
| 1 | Name( A *) |
| 2 | and(Name( A *), TypeApp(Group ([[wordprocessor, (wp1,wp2,wp3,wp4)]]))) |
| 3 | and(Name( A *), TypeApp(Group ([[wordprocessor, (wp1,wp2,wp3,wp4)]])) Date(Day)) |
| ...... | |

SYSTEM AND METHOD FOR RETRIEVING AND CLASSIFYING DATA STORED IN A DATABASE SYSTEM

BACKGROUND OF THE INVENTION

1. Field of the Invention

This invention relates to a retrieval interface system in an information management system such as a database management system or a file management system.

2. Description of the Related Art

A conventional database or file management system requires that the user should know the syntax of retrieval commands or image check conditions in the form of retrieval logical expressions such as AND and OR expressions to use the retrieval function. For this reason, the system uses a retrieval interface system for prompting the user to specify retrieval conditions in a dialog box and to select a display method and a sorting method for display of display elements of the retrieval result.

FIG. 12 is a block diagram showing the configuration of a retrieval interface system and a flow of data among the components of the interface system in a conventional file management system (HP VUE file manager) described in HP Visual User Environment User's Manual published by the Hewlett-Packard Company in 1991, for example. The retrieval interface system has a display management section 1 which manages input/output between the interface system and the user, a control section 2 which controls transfer of data among the components of the interface system and an entire flow of processing, a file database 3 which stores attributes attached to files and data, a file management section 4 which retrieves the contents of the file database 3 in response to retrieval conditions specified by the user through the display management section 1, a display element generation section 5 which converts elements of the retrieval result transferred from the file management section 4 into display elements, a display method storage section 6 which stores display methods called at the display element generation section 5, a sorter 7 which specifies a screen layout of display elements transferred from the display element generation section 5, and a sort method setting section 8 which calculates and sets screen locations of the display elements called at the sorter 7. A mouse 9, a keyboard 10, and a display 11 are connected to the display management section 11.

When the user specifies a filter corresponding to a retrieval condition, a display method, and a sort method through the mouse 9 or keyboard 10, the display management section 1 sends the specifications to the control section 2, which then sends the specified filter to the file management section 4, the display method specification to the display element generation section 6, and the sort method specification to the sorter 7. The retrieval results provided by file management section 4 are converted into display elements such as icons and lists by the display element generation section 5. The display elements are sorted in alphabetical order or size order by the sorter 7, and the display positions of the display elements are calculated. The display elements and their display positions are sent to the display management section 1 as pairs. The display management section 1 uses the pairs of display elements and display positions to create an output screen for representing the retrieval result, and displays the screen on the display 11.

FIG. 13 is a dialog box for specification of filters used in the conventional example, wherein the user can specify conditions concerning a file name 25, file size 26a, 26b, and file creation date 27a, 27b as retrieval conditions. FIG. 14 is a dialog box 28 for specification of a display method and dialog boxes 29a and 29b for specification of a sort method used in the conventional example.

Since the conventional retrieval interface system is thus configured, only entries satisfying the conditions specified in the filter are displayed as the display result. Therefore, the user cannot know what percentage of the entire data the retrieval result occupies or what other data and files exist.

A retrieval requires that the user should have a heuristic knowledge such as what conditions of the filter are to be made strict to narrow down data and files efficiently or such as what conditions are to be relaxed if the expected result cannot be obtained.

Further, if filter setting is improper, target data or files are not displayed although they exist. For this reason, a retrieval is repeated in a trial and error manner, requiring much time and labor. Particularly, when the number of data pieces to be retrieved increases, the time and labor required for a retrieval become enormous.

SUMMARY OF THE INVENTION

Accordingly, it is an object of the invention to provide a retrieval interface system which provides a retrieval system and a display system for the user to view the percentage of the retrieval result occupying the whole operation and the effect when strict conditions are specified in an information retrieval, and which suppresses missing of data and decreases the number of trial and error times for reducing the time and labor required for retrievals.

To this end, according to the invention, there is provided a retrieval interface system comprising display management means for managing input/output between the interface system and the user, file management means for accessing a database based on a retrieval condition specified by the user through the display management section, attribute classification means for classifying files according to file attributes, retrieval history registration means for registering a history of retrieval conditions and retrievals, display element generation means for converting the classification result provided by the attribute classification means into display elements, and means for controlling transfer of data among the means and the entire flow of processing, whereby classification and a retrieval are executed according to file attributes.

The attribute classification means has a section which stores classification methods of file attributes and a section which classifies the database contents according to classification methods stored in the classification method storage section.

The attribute classification means further includes a section which stores classification method registration information of pairs of classification methods and parameters specified by the user and a classification information management section which registers and deletes the classification method registration information.

The attribute classification means narrows down data by again classifying the classification result produced by a classification method specified by the user by another classification method different from the classification method.

The retrieval interface system further includes changeover switch means for switching from a retrieval to classification at the attribute classification means.

The retrieval history registration means has a history information storage section which retains conditions for retrieving data in the database as history information and a history management section which retrieves data in the data base based on retrieval conditions stored in the history information storage section, whereby retrievals are recorded and reproduced.

The display element generation means has a display element generation section which converts elements of the retrieval result transferred from the file management means into display elements and a quantity display conversion section which converts the display elements into the form in which the user can recognize the number of display elements intuitively.

The retrieval interface system having the configuration described above classifies the database contents into several groups with file attributes as keys at the classifying section and stores the classification method in the classification method storage section. When the user specifies a classification method and parameter, the classification information management section stores them in the classification information storage section.

The display element generation section generates display elements for displaying the classification result and the quantity display conversion section converts the display elements into the form in which the user can recognize the number of the display elements intuitively. The display management means displays the display elements.

Thus, the user can repeat classification of data in the database and selection of a specific group out of the classification result and always view the relationship between the notice group and other groups for narrowing down data.

Since the history management section retains the retrieval conditions in executed classification in the history information storage section as history information, classification can be reproduced in response to a user request.

Further, the change-over switch means enables the user to use both conventional retrieval conventional and classification of data in the database.

BRIEF DESCRIPTION OF THE DRAWINGS

In the accompanying drawings:

FIG. 8 is a table showing an example of the contents of a classification information storage section in the embodiment;

FIG. 9 is a drawing showing choices to classify the file database in the embodiment;

FIG. 11 is a table showing an example of history information in the retrieval interface system according to the embodiment of the invention;

DESCRIPTION OF THE PREFERRED EMBODIMENTS

Figure 1:
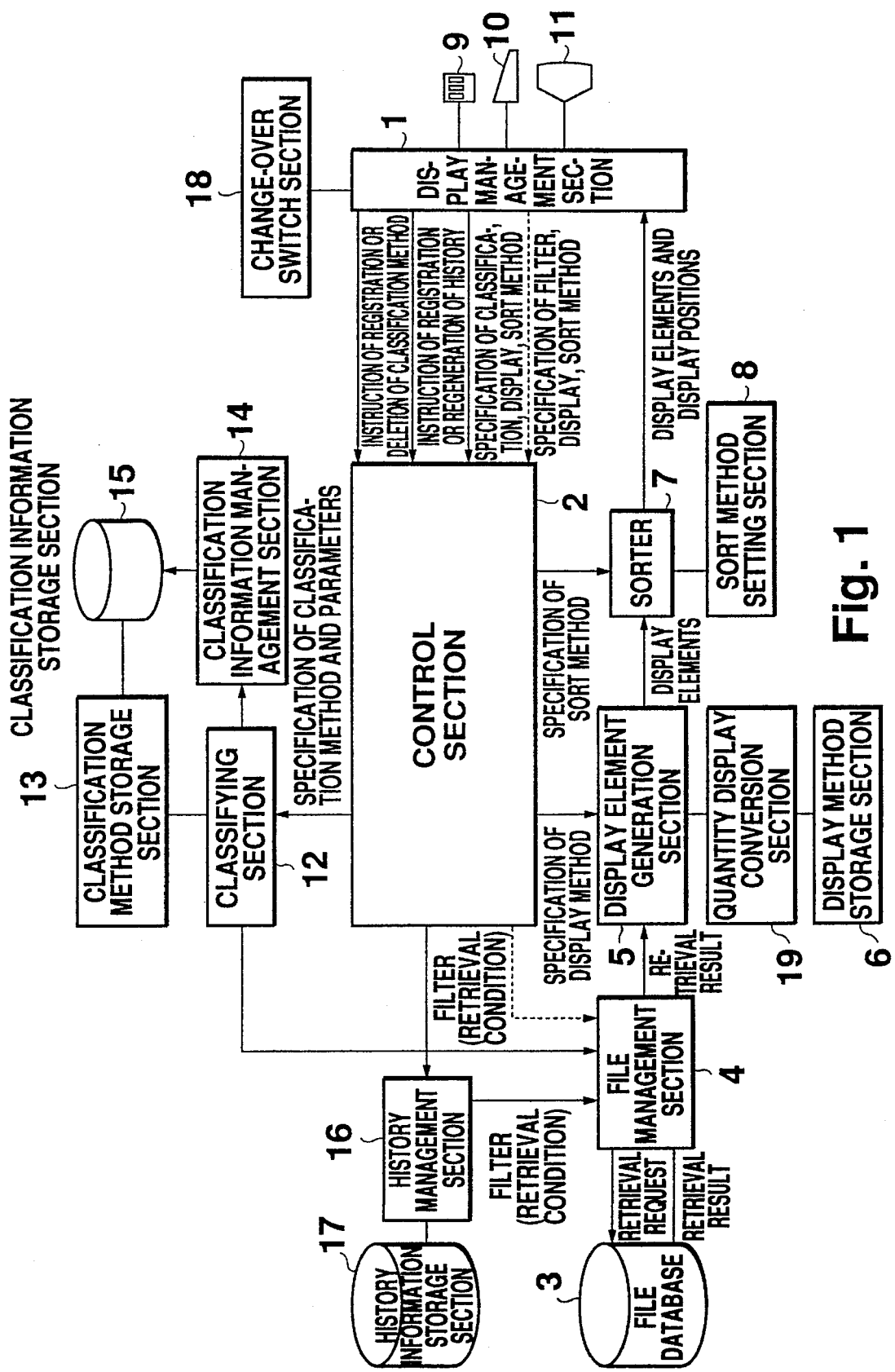
FIG. 1 is a block diagram showing the configuration of a retrieval interface system and a flow of data among the components of the interface system according to an embodiment of the invention.

Referring now to the accompanying drawings, there are shown preferred embodiments of the invention. Components identical with or similar to those previously described in the conventional example are denoted by the same reference numerals in the description to follow and will not be discussed again.

FIG. 1 is a block diagram showing the configuration of a retrieval interface system and a flow of data among the components of the interface system according to an embodiment of the invention. Attribute classification means for narrowing down target data while classifying files according to the file attributes in a retrieval of a database comprises a classifying section 12 which classifies the contents of a file database (simply, database) 3 based on specification of a classification method transferred from a display management section 1 to a control section 2, a classification method storage section 13 which stores file attribute classification methods, etc., called at the classifying section 12, a classification information storage section 15 which stores classification method registration information of pairs of classification methods specified by the user and parameters used for classification executed according to the classification method specification, and a classification information management section 14 which registers and deletes the classification method registration information. Retrieval history registration means for registering a history of retrieval conditions and retrievals comprises a history information storage section 17 which when a specific group is selected among the classification results by the user, retains retrieval conditions for retrieving the group from the database 3 as history information and a history management section 16 which retrieves the group from the database 3 by using the history information of the retrieval conditions in response to a user request. Further, newly provided are a change-over switch section 18 which when the user specifies a retrieval condition stored in the history information storage section 15 and commands that switching be executed, switches from retrieving as usual to classification executed by the classifying section 12 and a quantity display conversion section 19 which converts display elements representing each group obtained as the classification result into the form in which the user can recognize the number of elements in the group intuitively.

The operation of the retrieval interface system according to the embodiment will be described in conjunction with the accompanying drawings.

Figures 2, 3:
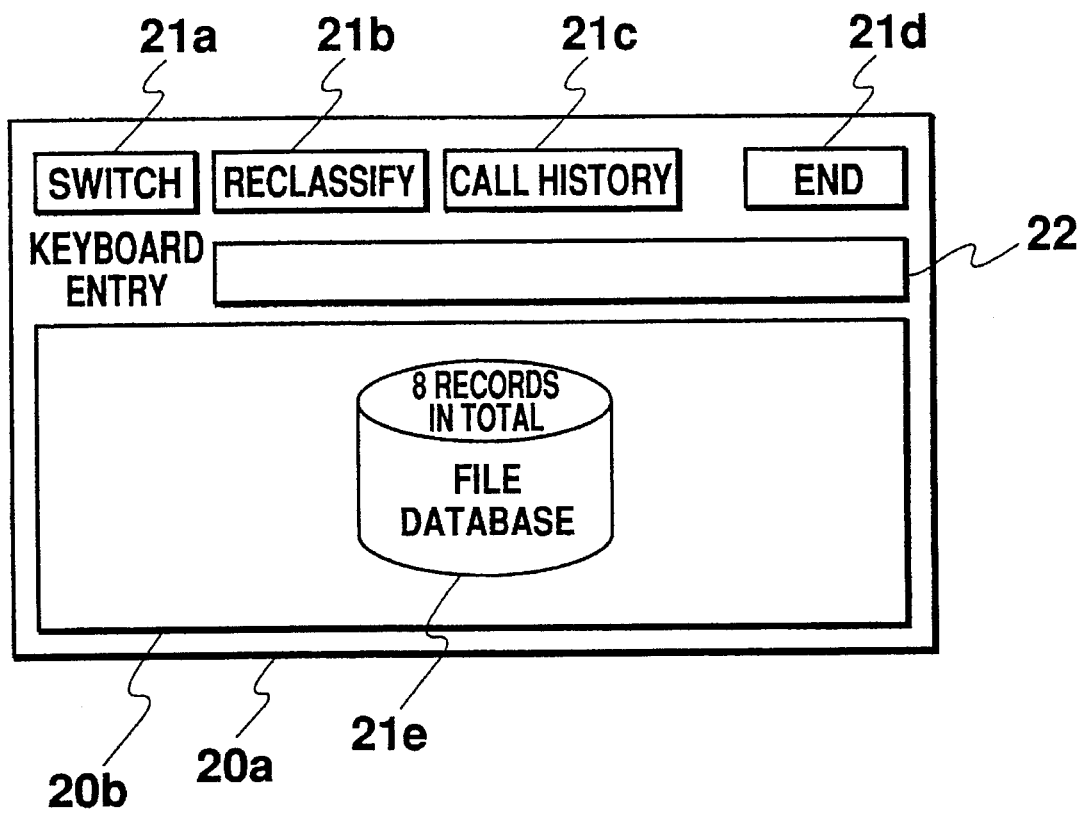
FIG. 2 is a drawing showing an example of the contents of a file database.
FIG. 3 is a drawing showing an example of an initial screen of the retrieval interface system according to the embodiment of the invention.

FIG. 2 shows an example of attribute data attached to files stored in the database 3. The attributes attached to the files are assumed to be a "file name" indicating the name of file, "size" indicating the file size, "type" indicating the application for creating the file, "creator" indicating the creator of the file, and "date" indicating the creation date of the file. FIG. 3 is an example of an initial screen displayed on a display 11 when the retrieval interface system is started, wherein windows 20a and 20b are shown for visually representing the retrieval interface system in the file management system. The window 20a is a window showing the appearance of the retrieval interface in the file management system. The window 20b is a display window of the classification result. Further shown in FIG. 3 are a switch button 21a of a retrieval and classification, a button 21b for again starting classification for the classification result displayed on the display window 20b of the classification result, a button 21c for calling history information of retrieval conditions stored in the history information storage section 17 and reproducing the past classification, a button 21d for ending retrieval processing, and an icon 21e representing one element (group) of the classification result or a button 21e for starting classification processing for further narrowing down the element. These buttons 21a to 21e visually represent areas responsive to input of a mouse 9 on the screen. When the user enters any characters through a keyboard 10, the characters are entered in a text box 22, which is an area used to enter parameters used with classification.

Figures 4, 5:
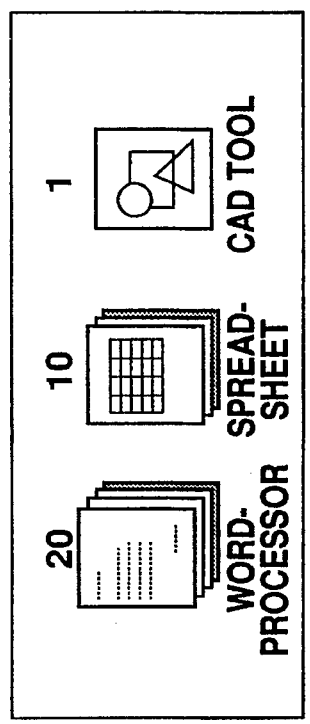
FIG. 4 is a drawing showing the correspondence between examples of the classification methods stored in the classification method storage section in the embodiment and the attributes attached to files.
FIG. 5 is a drawing showing an example of a display window displaying the display contents of the classification result generated by a quantity display conversion section in the embodiment.

FIG. 4 shows the correspondence between examples of the classification methods stored in the classification method storage section 13 and the attributes. When the type of attribute is a character string, such as "file name" or "creator," the methods of classifying into groups in alphabetical order of the first one character and according to the same first characters can be used. When the type of attribute is a numeric value, such as "size" or "date," the methods of classifying into groups by a specific numeric range and units can be used. Information indicating whether or not parameter specification is required is also related to the classification methods.

FIG. 5 is an example of the display window displaying the display contents generated by the quantity display conversion section 19 of the classification result. The display elements in the icon form generated by and stored in a display method storage section 6 are overlapped according to the number of elements in the group for visually showing quantitative information. Further, the number of elements is displayed in a numeric value above each icon and the group name below it.

Figure 6:
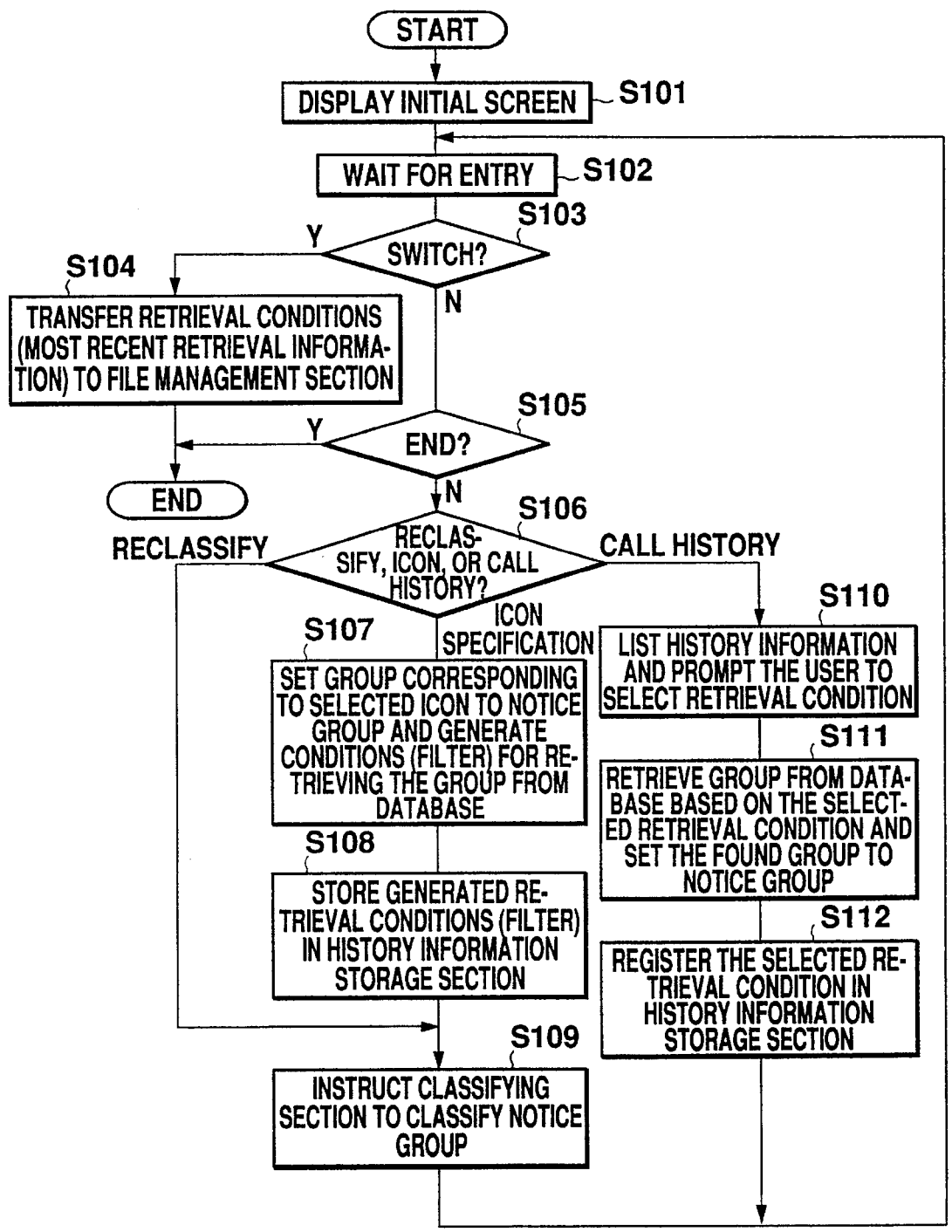
FIG. 6 is a flowchart of processing in the retrieval interface system according to the embodiment of the invention.

FIG. 6 is a flowchart showing processing of the retrieval interface system according to the embodiment. As shown in the figure, the process flow is looped in response to a user entry until the user clicks the END button 21d. First, the initial screen as shown in FIG. 3 is displayed at step 101 and the system waits for the user to make an entry at step 102. Then, when the user makes an entry through the mouse 9, the display management section 1 sends the user entry to the control section 2. At step 103, if the entry is made by clicking the SWITCH button 21a, the control section 2 instructs that the retrieval condition, the most recent history information, be fetched from the history management section 16, and sends the obtained retrieval condition to a file management section 4 and performs conventional processing at step 104, then terminates it. In FIG. 1, the broken line denotes a conventional data flow. At step 105, if the entry is made by clicking the END button 21d, the control section 2 terminates the retrieval processing.

At step 106, if the entry is made by clicking the RECLASSIFY button 21b, the control section 2 instructs the classifying section 12 to classify the set of groups displayed on the display window 20b at step 109. At this time, the notice group is not changed. At step 106, if the entry is made by selecting (clicking) the icon displayed on the display window 20b, the control section 2 sets the group corresponding to the selected icon to the notice group and generates conditions for retrieving the group from the database 3 at step 107, then transfers the conditions to the history management section 16. The retrieval conditions transferred to the history management section 16 are stored in the history information storage section 17 at step 108. Further, the control section 2 instructs the classifying section 12 to classify the notice group at step 109. At step 106, if the entry is made by clicking the CALL HISTORY button 21c, the control section 2 lists the retrieval conditions stored in the history information storage section 17 at step 110, and sets the group retrieved from the database 3 based on the retrieval condition selected among them by the user to the notice group at step 111. At the time, the contents of the display window 20b are updated to the icon representing the notice group, and the selected retrieval condition is again stored as the most recent history information in the history information storage section 17 via the history management section 16 at step 112.

Figure 7:
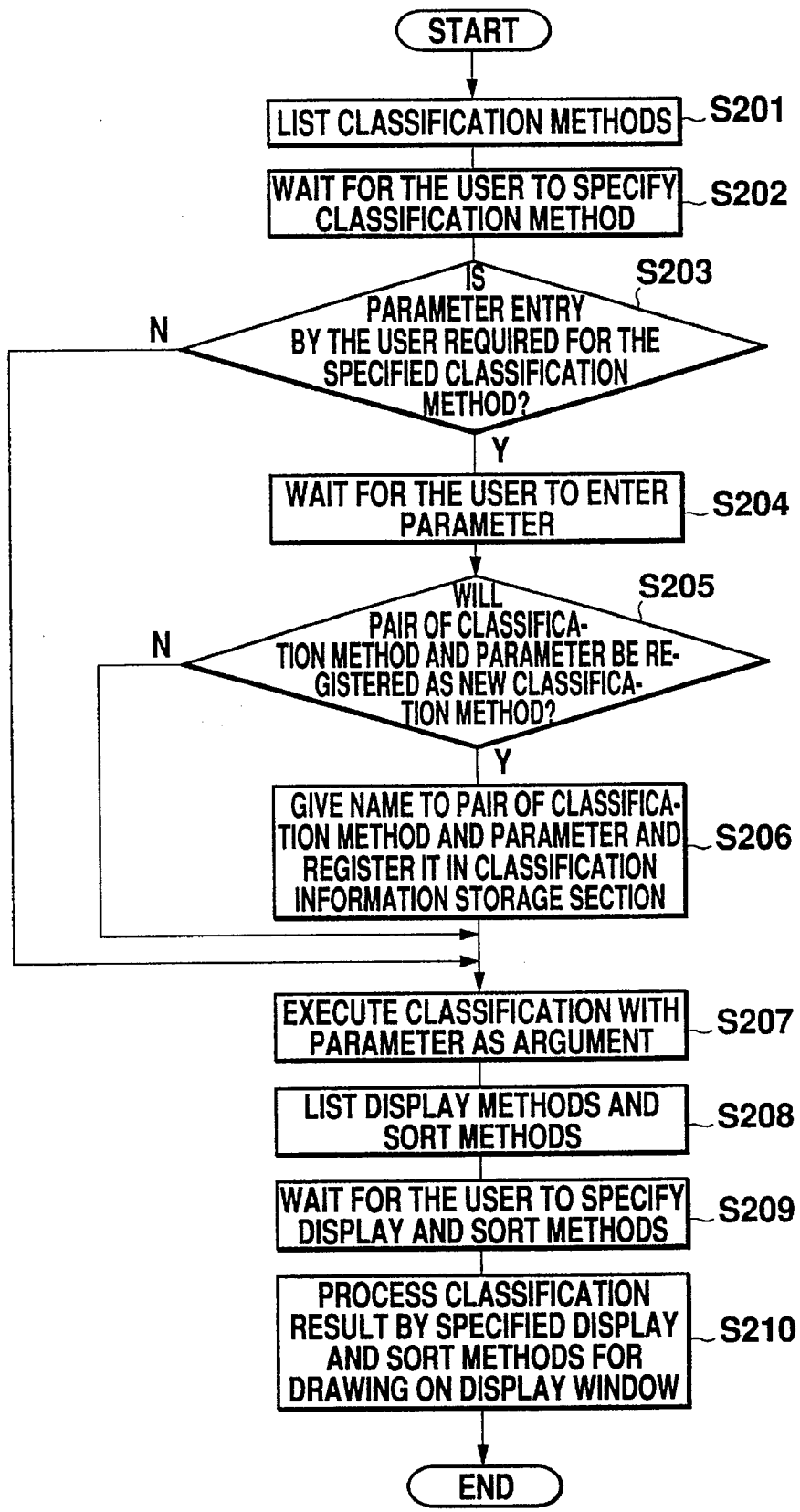
FIG. 7 is a flowchart of classification in the retrieval interface system according to the embodiment of the invention.

FIG. 7 is a flowchart of classification in the retrieval interface system according to the embodiment and shows a flow of processing of the classifying section 12 and the classification information management section 14. When receiving an instruction of classifying the notice group from the control section 2, the classifying section 12 lists the classification method registration information registered in the classification information storage section 15 at step 201 and waits for the user to specify a classification method at step 202. FIG. 8 is a table showing an example of the contents of the classification information storage section 15. The classifying section 12 calls the classification method specified by the user from the classification method storage section 13 and classifies the notice group. FIG. 9 shows choices to classify the file database 3 on the initial screen shown in FIG. 3. It indicates that various classification methods are available for the single database 3 depending on which of the five attributes of "file name," "size," "type," "creator," and "date" the user takes notice of. In the example, in addition to sorting according to the "file name" and "size," classification 24a according to the type of application created documents, classification 24b according to the creation date, and classification 24c according to the creator are shown.

At step 203, the classifying section 12 determines whether or not "parameter entry by the user" is required for the classification method specified by the user. This determination can be made from "parameter specification" in the classification method storage section 13, as shown in FIG. 4. If parameter specification is required, the system waits for the user to enter a parameter in the text box 22 shown in FIG. 3 at step 204. If parameter entry is not required, classification is executed by using the parameters described in the classification method registration information registered in the classification information storage section 15 at step 207. When the user enters a parameter, the classifying section 12 asks the user whether or not a pair of the specified classification method and entered parameter is to be registered as a new classification method at step 205. If the user requests registration of the pair, the classifying section 12 registers the pair in the classification information storage section 15 via the classification information management section 14 at step 206.

Classification 24a in FIG. 9 shows the classification result of the contents of the database 3 by the type of application used for creation of files. Classification 23 in FIG. 8 shows an example where the classification method and parameters used to obtain the classification result are registered as a new classification method. In classification 23 in FIG. 8, the name of the classification method is "application classification (1)", the name of the program of the classification method executed is "TypeApp", and the names of the applications belonging to "Wordprocessor", "CAD tools", and "Spreadsheet" are registered as parameters.

A database retrieval is repeated several times via the file management section 4 in the process of classifying the notice group at the classifying section 12, and the final classification result is sent to a display element generation section 5. Display element generation means in the embodiment comprises the display element generation section 5, the display element storage section 6, and the quantity display conversion section 19. The display element generation section 8 lists the display methods and a sorter 7 lists the sort methods at step 208, and the system waits for the user to enter display and sort methods at step 209. When the user specifies display and sort methods, the display element generation section 5 calls the display method corresponding to the user specification from the display method storage section 6, and uses the obtained display elements to generate the final display elements via the quantity display conversion section 19. The display elements generated by the display element generation section 15 are sent to the sorter 7 which then calls the sort method specified by the user from the sort method setting section, and calculates the display positions of the display elements on the display window 20b. The display elements generated by the display element generation section 5 and the display positions calculated by the sorter 7 are sent to the display management section 1 for drawing on the display window 20b at step 210.

Figure 10:
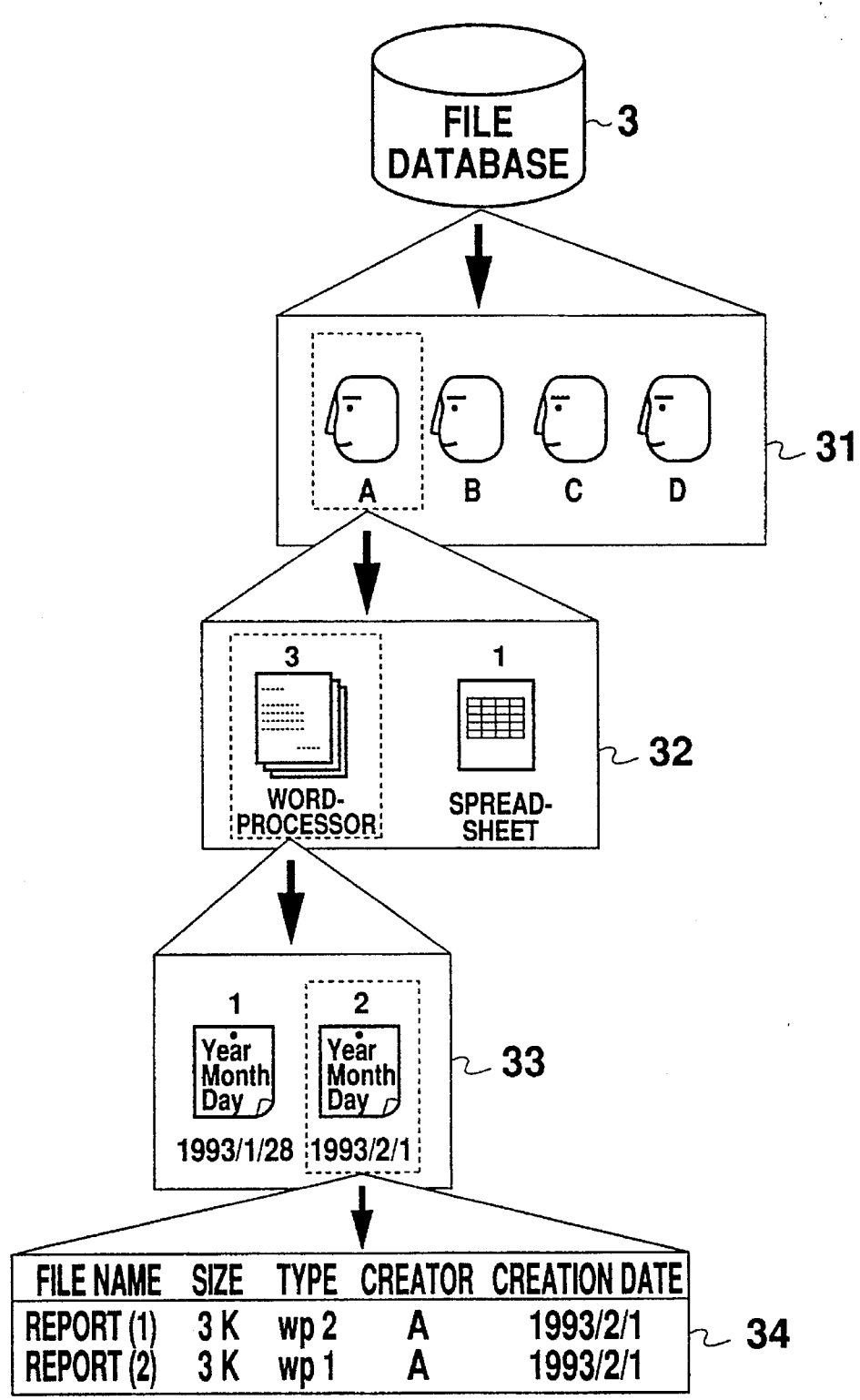
FIG. 10 is a drawing showing the process and result of a sequence of classification steps using the retrieval interface system according to the embodiment of the invention.
Figure 12:
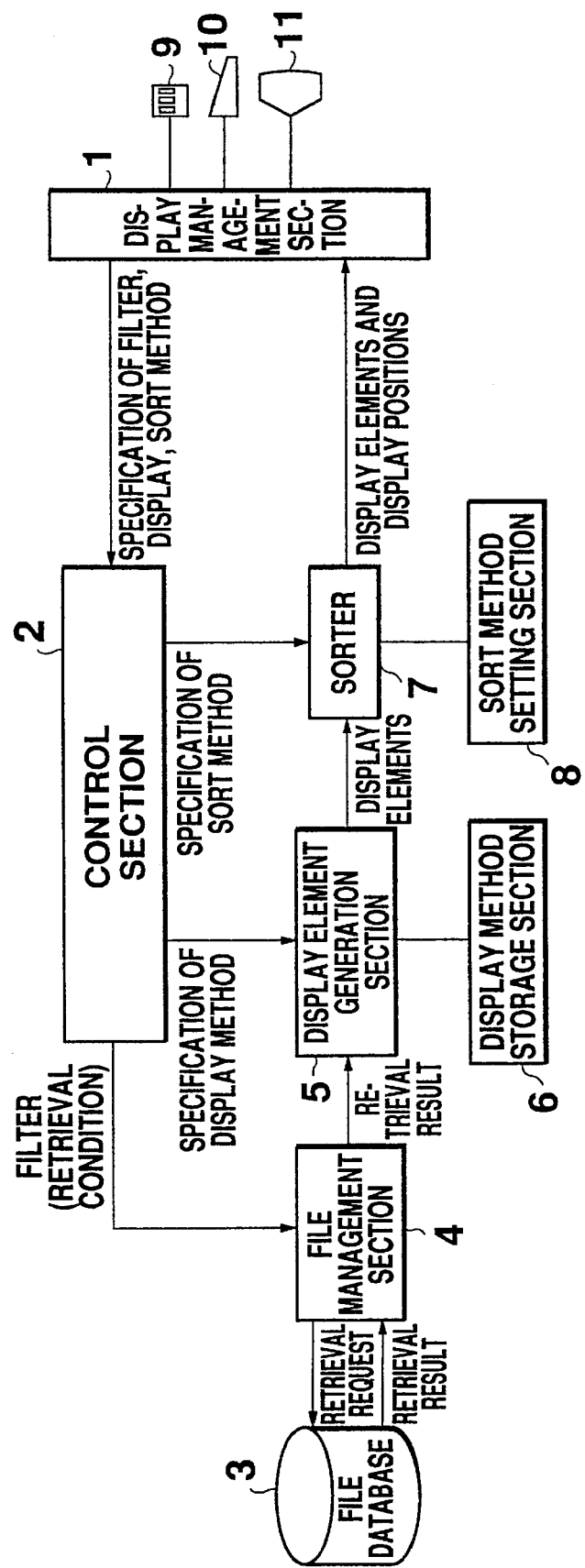
FIG. 12 is a block diagram showing the configuration of a retrieval interface system and a flow of data among the components of the interface system in a conventional file management system.
Figure 13:
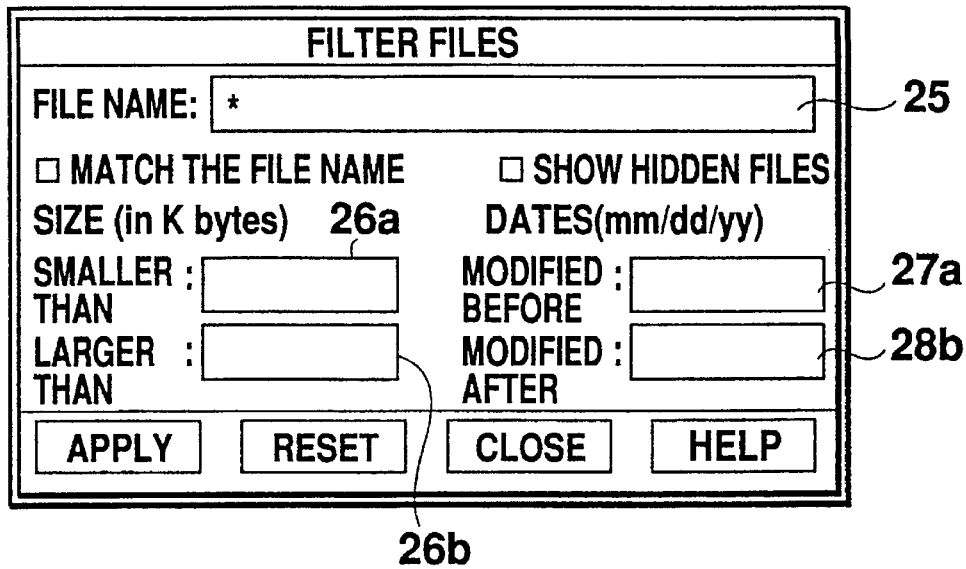
FIG. 13 is a dialog box for specification of filters (retrieval conditions) at the retrieval interface system in the conventional file management system.
Figure 14:
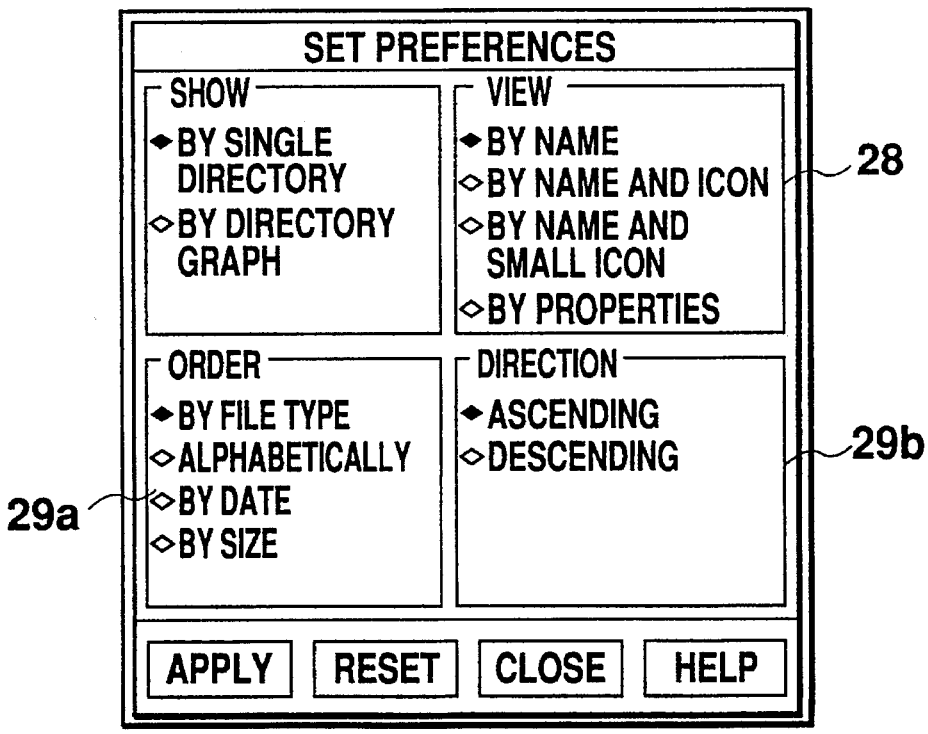
FIG. 14 is dialog boxes for specification of display and sort methods at the retrieval interface system in the conventional file management system.

FIG. 10 gives an example showing the process and result of the classification described above, and represents change in the contents displayed on the display window 20b. It shows the process in which the contents of the database 3 are narrowed down gradually according to the attributes of the file creator, application type, and creation date. First, "creators" of the file attribute are classified by the classification method "classification by family name" and the classification result is sorted by the display method "icon" and by the sort method "ascending order of alphabetical order." Resultantly, icons are displayed as shown in display contents 31 in FIG. 10. Here, "A" is selected among the icons. It is seen that parameter entry is not required for the classification method "classification by family name" from FIG. 4. Next, the retrieved classification result is classified by the type of application used for creation of documents and the classification result is displayed in icon form and sorted in the descending order of alphabetical order. Resultantly, icons are displayed as shown in display contents 32. Here, the group "files created with wordprocessors" is selected among the icons. Further, the retrieved classification result is classified by the creation date of files and the classification result is sorted in the ascending order of alphabetical order. Resultantly, icons are displayed as shown in display contents 33. Here, the group "files created on Feb. 1, 1993" is selected among the icons. Then, the retrieval result is sorted in the ascending order of alphabetical order of the file names. Resultantly, the retrieval result 34 is displayed.

Thus, data can be narrowed down by the classification in the embodiment.

If the user selects an icon at step 106 in the flowchart of FIG. 6, the conditions for retrieving the group corresponding to the selected icon are stored in the history information storage section 17 as history information. FIG. 11 is a table showing history information of retrieval conditions generated in a sequence of the classification steps shown in FIG. 10 and stored in the history information storage section 17, wherein is show the condition 25 for retrieving the group "creator is A", the condition 26 for retrieving the group "creator is A and application used for creation of files is wordprocessor", and the condition 27 for retrieving the group "creator is A and application used for creation of files is wordprocessor and creation date is Feb. 1, 1993".

Although it is shown that a pair of the classification method and parameter can be registered as a new classification method in the embodiment, the user can select any method among the new and original classification methods without discrimination after registration. When switching from retrieval, the user can also specify history information and assign the initial screen to specific classification. Thus, the retrieval interface system can be easily customized to an interface dedicated to the user according to the embodiment.

According to the invention as described above, target data can be narrowed down while files are classified according to the file attributes in a retrieval of a database.

Also, the quantity display conversion section, which clarifies the number of elements in each group obtained as a result of classification, is provided for clarifying the percentage of the notice group occupying in the whole and the relationship with other groups. Thus, missing of the target data in narrowing down data can be suppressed.

Further, since a history of retrieval methods and retrievals can be registered, the classification result can be reclassified by a different classification method in response to a user request and therefore classification can be again reexecuted easily from the beginning and the narrowing down steps can be easily reversed.

Thus, the number of trial and error times during a retrieval is reduced and a user load (time and labor) during a retrieval is saved. A conventional retrieval can also be made.

What is claimed is:

1. A retrieval interface system comprising:

display management means for managing input/output between said interface system and a user;

file management means for accessing files in a database based on a retrieval condition according to a first set of file attributes specified by the user through said display management means to provide a retrieval result of files;

attribute classification means for classifying files of the retrieval result, according to a second set of file attributes, and for providing a classification result;

display element generation means for converting the classification result provided by said attribute classification means into display elements; and control means, coupled to the display management means, the file management means, the attribute classification means, and the display element generation means, for controlling transfer of data and an entire flow of processing among said means.

2. The retrieval interface system as claimed in claim 1 wherein said attribute classification means includes:

a classification method storage section which stores classification methods of file attributes; and a classifying section which classifies the files of the retrieval result according to at least one classification method stored in said classification method storage section to provide said classification result.

3. The retrieval interface system as claimed in claim 2, wherein said attribute classification means further includes:

a classification information storage section which stores a plurality of classification method registration information, each information including a classification method and corresponding parameters specified by the user; and a classification information management section which registers and deletes classification method registration information in and from said classification information storage section.

4. The retrieval interface system as claimed in claim 3 wherein said classification section classifies files of the retrieval result according to a first classification method specified by the user, and according to a second classification method different from said first classification method.

5. The retrieval interface system as claimed in claim 3, further comprising change-over switch means for switching modes of the retrieval interface system between a retrieval mode and a classification mode in which previously retrieved files are classified according to attributes of the files.

6. The retrieval interface system as claimed in claim 2 wherein said classifying section causes said classification method registration information to be registered in response to a user request.

7. The retrieval interface system as claimed in claim 2 further comprising change-over switch means for switching modes of the retrieval interface system between a retrieval mode and a classification mode in which previously retrieved files are classified according to attributes of the files.

8. The retrieval interface system as claimed in claim 1, wherein said attribute classification means further includes:

a classification information storage section which stores a plurality of classification method registration information, each information including a classification method and corresponding parameters specified by the user: and a classification information management section which registers and deletes classification method registration information in and from said classification information storage section.

9. The retrieval interface system as claimed in claim 4, further comprising change-over switch means for switching modes of the retrieval interface system between a retrieval mode and a classification mode in which previously retrieved files are classified according to attributes of the files.

10. The retrieval interface system as claimed in claim 1, further comprising change-over switch means for switching modes of the retrieval interface system between a retrieval mode and a classification mode in which previously retrieved files are classified according to attributes of the files.

11. The retrieval interface system as claimed in claim 1 wherein said display element generation means includes:

a display element generation section which converts elements of the retrieval result and the classification result transferred from said file management means into a plurality of display elements; and a quantity display conversion section which converts said display elements into a form in which the user can recognize a quantity of said display elements a graphical representation of the display elements.

12. The retrieval interface system as claimed in claim 11, wherein said quantity display conversion section causes said display elements to be displayed by using a quantity of overlapping icons, the quantity of overlapping icons corresponding to the number of display elements contained in a group.

13. The retrieval interface system as claimed in claim 11, wherein said quantity display conversion section causes the number of said display elements contained in a group to be displayed by a numeric value.

14. The retrieval interface system of claim 1, further comprising retrieval history registration means for registering a history of retrieval conditions and retrievals.

15. The retrieval interface system of claim 14, wherein said retrieval history registration means includes:

a history information storage section which stores conditions for retrieving data and said database as history information; and a history management section which retrieves data in said database based on retrieval conditions stored in said history information storage section.

* * * * *